United States Patent [19]
Ray

[11] Patent Number: 5,804,941
[45] Date of Patent: Sep. 8, 1998

[54] DUAL MODE POSITION CONTROL SYSTEM WITH SPEED PROFILING

[75] Inventor: William F. Ray, Nottingham, England

[73] Assignee: Switched Reluctance Drives Limited, Harrogate, United Kingdom

[21] Appl. No.: 788,936

[22] Filed: Jan. 24, 1997

[30] Foreign Application Priority Data

Jan. 29, 1996 [GB] United Kingdom .................. 9601753

[51] Int. Cl.⁶ .................................................. G05B 19/18
[52] U.S. Cl. ...................... 318/569; 318/685; 318/696; 318/254; 318/138; 318/439
[58] Field of Search .................................... 318/685, 696, 318/254, 138, 439, 569

[56] References Cited

U.S. PATENT DOCUMENTS

| | | | |
|---|---|---|---|
| 4,398,138 | 8/1983 | Kohzai et al. | 318/603 |
| 4,591,774 | 5/1986 | Ferris et al. | 318/696 |
| 5,519,465 | 5/1996 | Kawamura et al. | 318/696 X |

FOREIGN PATENT DOCUMENTS 0 429 659  6/1991  European Pat. Off. .......... H02P 8/00

OTHER PUBLICATIONS

Stephenson and Blake, "The Characteristics, Design and Applications of Switched Reluctance Motors and Drives," PCIM Conference & Exhibition, Jun. 21–24, 1993, Nuremberg, Germany.

*Primary Examiner*—Karen Masih
*Attorney, Agent, or Firm*—Arnold, White & Durkee

[57] ABSTRACT

A control system is provided for use with an actuator in a load-positioning assembly. The actuator and its load are quickly and accurately driven to a target position using dual control modes. When the distance from the target position is large, a speed control mode is used. In this mode, the actuator is operated according to a speed demand profile which is a function of a programmable maximum speed and the distance remaining to the target position. When the distance to the target position is small, a stepping mode is selected for final positioning of the actuator and its load.

27 Claims, 8 Drawing Sheets

DUAL MODE POSITION CONTROL SYSTEM WITH SPEED PROFILING

FIELD OF THE INVENTION

The present invention relates generally to the use of electrical machines in load-positioning assemblies, and more particularly, to a position control system having two operating modes including a speed profiling mode and a stepping mode for quickly and accurately moving a load to its target position without overshooting or undershooting.

BACKGROUND OF THE INVENTION

It is known that an electrical machine can be used in a wide variety of load-positioning assemblies in which the machine is used to control the position of a load. Examples of such positioning assemblies include braking actuator systems, automatic door openers, robotic equipment, and the like. In some of the applications, the speed of response of the system is very important.

It is frequently a requirement of positioning assemblies that the machine be driven precisely and quickly to a predetermined position that corresponds to a target position of the load (e.g., an actuator controlling an aircraft aileron, or a brake position in a braking system). In many such systems, there are serious adverse consequences of undershooting or overshooting the target position. For example, undershooting the target position in a braking system may render the brakes ineffective, whereas overshooting in such a system may cause the brakes to lock or cause damage to the brake pads or the surface being braked. In the prior art, some systems have used low actuator speeds in order to ensure accurate positioning. While running at slow speeds allows accurate positioning by increasing the time available for incremental adjustments to a position based on feedback data, the consequent increase in the time needed to position the load may be unacceptable in the application. Automobile braking systems, for example, must have very quick response times in order to be effective. This is especially true for anti-lock brakes, which may require repetitive actuation at a rate on the order of five cycles per second.

Some prior art systems have attempted to provide high accuracy of placement and fast response time by using multiple motor modes. Such systems have, for example, driven a motor at a constant high speed until the motor is in a first position, then switched to a braking mode for deceleration, and finally switched to a stepping mode to carry the motor in incremental steps to its final target position. U.S. Pat. No. 4,591,774 is an example of such a system. Disadvantages associated with these prior art systems are that the pre-calculated positions can be in error, leading to positioning at the wrong target, and that the accuracy of position is often degraded by the gearing introduced between the motor and the load.

Other known forms of controllers for positioning of electrical machines used closed-loop control to attempt to bring the machine to a target position. These systems normally result in some degree of overshoot by the machine, with the system then oscillating about the target position before settling. The time to settle can be as much as 20–30% of the total positioning time. Attempts to eliminate the overshoot in such closed-loop systems usually involve further damping of the response, so resulting in an unwanted increase in the position time.

SUMMARY OF THE INVENTION

The present invention is directed to a position control system for a reluctance machine used in a load-positioning assembly. According to the present invention, the machine and its load can be quickly and accurately positioned using dual control modes. When the "position error", or distance from the desired position, is large, a speed control mode is used. When the machine is near the desired position, a stepping mode is used. By combining these two modes in a particular manner, the load can be positioned precisely at the required target position as quickly as possible with the given system, but without overshoot or undershoot. The time required to reach the target position is therefore minimized. This method combines the advantages of the two modes in such a way as to avoid the disadvantages usually associated with them.

In the speed control mode, the motor is operated according to predetermined profiles of maximum accelerating and braking capabilities. A table is provided for storing the speed demand profile that designates machine operating speed as a function of the distance remaining to the desired position. The table is preferably large enough to store more than one speed profile so that the machine may be operated in a variety of ways according to a variety of input parameters. The speed demand numbers stored in the table are supplied to control circuitry for use in synchronizing phase firings so as to run the machine at the desired speed. In a preferred mode of operation, speed control mode is used for high speed operation of the machine when the distance from the target is large. As the distance from the target decreases, the demanded speed may be progressively reduced in a controlled manner to prevent overshooting and other problems.

Once machine speed has been reduced below a certain threshold, stepping mode is selected for the final positioning. An artificial firing-signal generator may be used to feed firing signals from the position control system to the power converter system of the machine, allowing the machine to be brought quickly and precisely to its target position.

BRIEF DESCRIPTION OF THE DRAWING

The features and advantages of the present invention will be best appreciated with reference to the following detailed description and specification and the accompanying drawings, wherein.

DETAILED DESCRIPTION OF THE PREFERRED EMBODIMENTS

The features of the present invention may be fully understood with reference to the following detailed description. In all cases, it should be understood that this discussion is made with reference to exemplary embodiments. These embodiments are not intended to limit the scope of the invention as defined by the claims. Variations and modifications of the specific embodiments described herein will be apparent to those skilled in the art. For example, while the invention is described with reference to a rotating electric motor the skilled person will be aware that it is equally applicable to linear motors as well. In a linear motor the moving member is often referred to as a rotor. The term 'rotor' herein is intended to embrace such moving members of linear motors.

Figure 1:
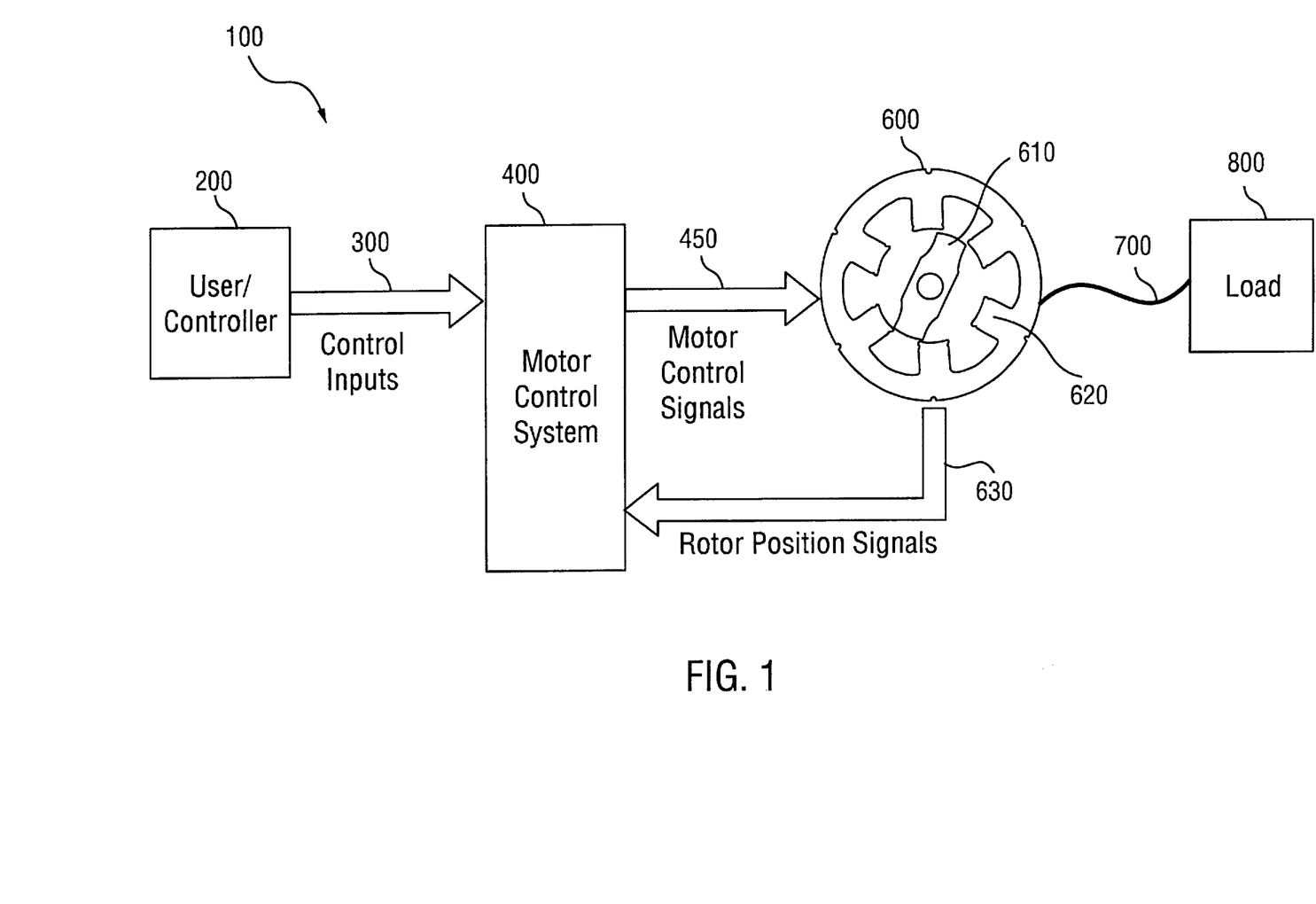
FIG. 1 is a schematic diagram of a load-positioning assembly according to the present invention.

FIG. 1 shows an overview of a load-positioning assembly 100 embodying the features of the present invention. Actuator 600 is depicted as a simple three-phase switched reluctance motor having rotor 610 and stator 620. It will be appreciated that the present invention may be advantageously applied to other kinds of reluctance machines, including machines with more or fewer phases.

Actuator 600 is operatively coupled to load 800. Load 800 may be any device that is to be moved to a certain target location. For example, load 800 may be a brake assembly to be moved into contact with a surface to be braked. Interface 700 is a system for relating the angular position of motor 600 to the position of load 800. Interface 700 may be a mechanical interface. It may include an assembly for converting the angular motion of motor 600 into linear motion of load 800. For example, interface 700 may be a bearing shaft for a brake assembly. Interface 700 may include a gear assembly. Interface 700 may simply be a non-converting mechanical interface (e.g., an axle). Alternatively, interface 700 may be a non-mechanical system that actuates load 800 by electrical or other means according to the angular position of actuator 600.

Motor control system 400 controls actuator 600 by rotating rotor 610 to a desired angular position corresponding to a target position of load 800. This involves providing motor control signals 450, including for example power for the windings for each phase, to actuator 600 so as to produce torque on rotor 610. Motor control system 400 is shown receiving rotor position signals 630, which are feedback signals used to track the angular position and speed of actuator 600, as described below. Motor control system 400 also receives control inputs 300, which are inputs provided by user/controller 200 to govern the operation of the load-positioning assembly 100. User/controller 200 may be a computer or human, or may be omitted entirely where there is no need for dynamic motor control.

Figure 2:
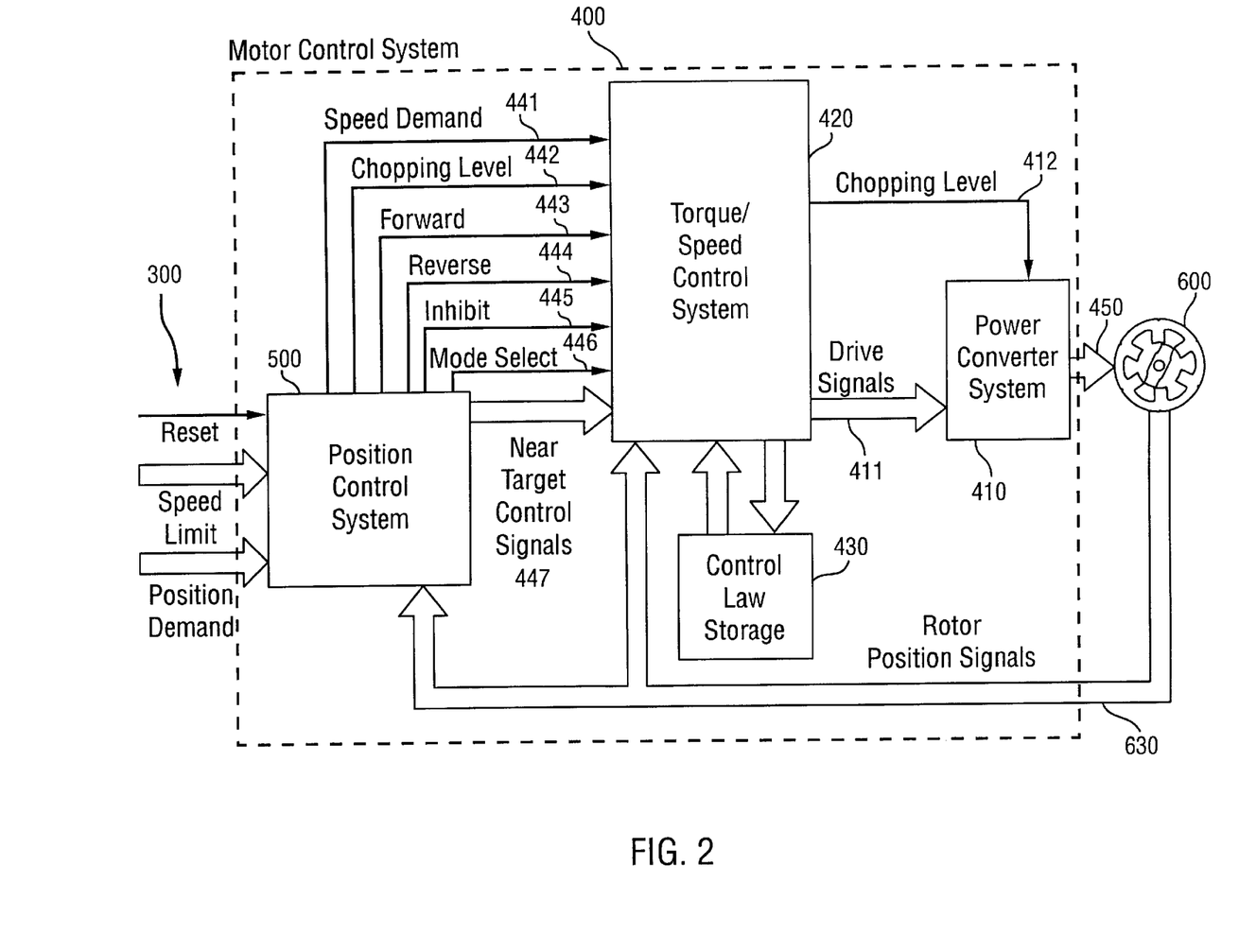
FIG. 2 is a functional block diagram showing greater detail on a motor control system of the present invention.

FIG. 2 shows greater detail on motor control system 400. Control inputs 300 are shown comprising a reset input, a speed limit input, and a position demand input. The reset input can be used to initialize the various counters and latches in the system at any desired time. The speed limit input for only a single profile is considered here. It is preferably a 4-bit digital signal that specifies a maximum speed at which actuator 600 should be operated during a particular positioning operation. The position demand signal is preferably an 8-bit digital signal that specifies a desired angular position of rotor 610 relative to stator 620 that corresponds to the target position of load 800. These control inputs 300 may be used by user/controller 200 dynamically to program and control the operation of actuator 600. Other control inputs may be used to control various other parameters of operation. Alternatively, control inputs 300 might comprise only a single set/reset input where, for example, the position demanded and the maximum speed is always the same. Those skilled in the art will realize that, if the nature of the interface 700 is sufficiently well-defined, it would be possible to use position feedback from the load 800 to either supplement or replace the position feedback from the actuator 600.

Power converter system 410 is of conventional construction. The function of this unit is to convert control signals into electrical outputs. In this regard, power converter system 410 supplies motor control signals 450, including power for the windings for each phase, to motor 600 in order to stimulate its operation. Power converter system 410 is shown receiving drive signals 411, which are output from torque/speed control system 420. Drive signals 411 coordinate firing of the various phases of motor 600. Power converter system 410 also receives chopping level 412, a parameter used to control the current level in the windings of motor 600.

Torque/speed control system 420 synchronizes firing of the motor phases to maintain the proper rotation of motor 600. In this regard, torque/speed control system 420 produces drive signals 411 and chopping level 412. Torque/speed control system 420 operates subject to a plurality of control laws, which optimize motor performance at some or all operating points. These control parameters are stored at control law storage 430, which is shown coupled to torque/speed control system 420.

Rotor position signals 630 are routed to position control system 500 and torque/speed control system 420 for processing to determine an angular position of rotor 610 in motor 600. As is known, rotor position signals 630 comprise signals from a plurality of sensing heads located in motor 600. Rotor position signals 630 indicate the position of rotor 610 relative to each sensing head. As rotor 610 rotates in motor 600, each sensing head produces a pulse train indicating the periodic proximity of rotor 610 to that sensing head. These signals can be combined to precisely track the angular position of rotor 610 over time. Rotor position signals 630 preferably comprise signals from enough sensing heads to create a 60 pulse per revolution (ppr) pulse train that can be used to monitor the position of rotor 610 with a high degree of accuracy. It would be possible to use other known methods of providing motor position information. For example a different number of sensing heads could be used, or a so-called "sensorless" method could be used to synthesize position signals without the presence of a physical position detector. It should be emphasized that blocks 410, 420 and 430 can all be constructed according to known principles familiar to those of ordinary skill in the motor control art.

Position control system 500 provides the interface between user/controller 200 and the motor control system. Position control system 500 generates a speed demand signal 441, chopping level signal 442, forward signal 443, reverse signal 444, inhibit signal 445 and mode select signal 446. Speed demand signal 441 is preferably an analog signal indicative of the desired motor speed for running motor 600 in the speed control mode. Chopping level signal 442 is an analog signal generated by position control system 500 and passed through torque/speed control system 420 as chopping level 412 for use by power converter system 410 in the stepping mode operation. Forward signal 443 and reverse signal 444 indicate a desired direction of rotation of motor 600. Inhibit signal 445 indicates that rotation of motor 600 should be inhibited because, for example, motor 600 is already in its desired angular position. Mode select signal 446 indicates whether motor 600 should be operated in the speed control mode or the stepping mode. Also, near target control signals 447 are provided for control of motor phase firing when motor 600 is operated in stepping mode, as described below.

Those skilled in the art will recognize that there are various other ways of constructing a motor control system that are consistent with the objectives and features of the present invention.

Figure 3:
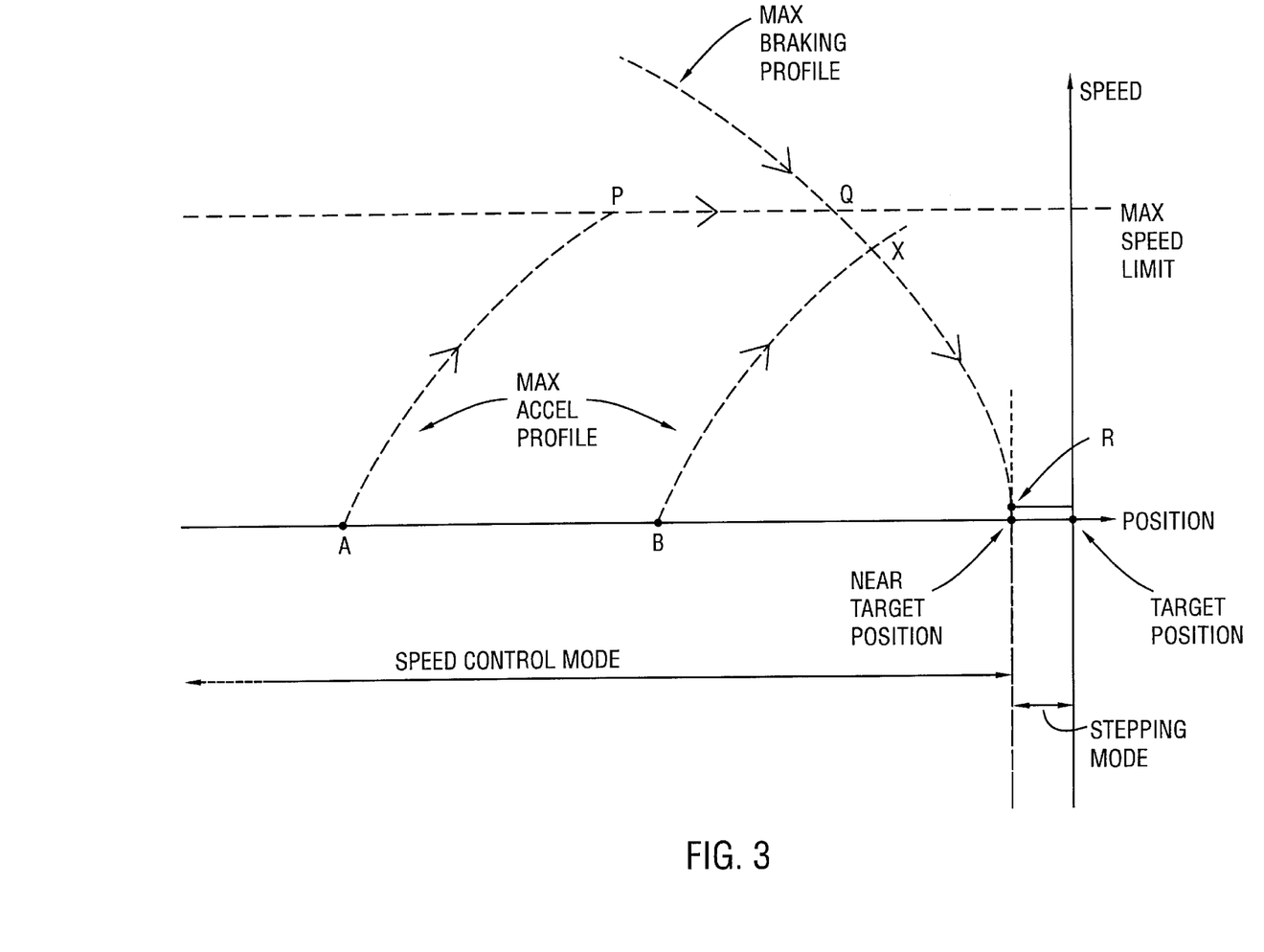
FIG. 3 is a graph of motor speed as a function of position illustrating dual motor control modes according to the present invention.

FIG. 3 is a speed profile that illustrates the preferred mode of operation of motor control system 400 as well as the relative positions of a target position for the system, a near target position, a chosen maximum speed line, and two exemplary starting positions for the system, A, and B. As is illustrated, motor 600 can be operated in one of two modes: (i) a speed control mode and (ii) a stepping mode. When operating in the speed control mode, the system will have maximum braking capability. This capability is dependent on the speed of the system, the available braking torque, the inertia of the rotor 610, and the characteristics of interface 700 and load 800. When plotted as a function of distance, the braking capability gives rise to the type of characteristic shown in FIG. 3. This characteristic has been drawn in FIG. 3 to show the distance from the near target position which is required to brake the system from any speed. Also when operating in speed control mode, the system will have a maximum acceleration capability. This capability is dependent on the speed of the system, the available motoring torque, the inertia of the rotor 610 and the characteristics of interface 700 and load 800. When plotted as a function of distance, the accelerating capability gives rise to the type of characteristic shown in FIG. 3.

In operation, it may be necessary to limit the speed of the motor to a particular value (e.g. for safety or other reasons). Such a maximum speed value is shown in FIG. 3. It will be appreciated that the system could be operated at an acceleration rate and/or a braking rate which falls below the maximum possible. This would correspond to operation below the curves shown in FIG. 3. In this case, the system would not perform its positioning duty in the shortest possible time. The "MAX ACCEL PROFILE" curves shown in FIG. 3 would normally be the trajectories described by the motor when allowed to accelerate as fast as it is able. Those skilled in the art will realize that it would be a routine matter to limit the acceleration of the machine in any predetermined fashion, e.g. by storing a required profile and forcing the machine to follow it.

It will be realized that, because the maximum braking capability is dependent on the various factors described above, it may be appropriate to store several different profiles so that, e.g. wear in the system can be compensated. For simplicity of description, only a single profile is considered here.

If it is desired, for example, to move from point A to the target position, then according to the invention, the method of operation is to enter the speed control mode, accelerate at maximum acceleration up the trajectory shown to point P, run at maximum speed to point Q, brake down the maximum braking trajectory to a predetermined low speed at point R, swap from speed control mode to stepping mode in an orderly fashion, and step to the target position for the remainder of the distance. In this way, the positioning operation is carried out in the minimum possible time without over- or under-shooting the target.

If it is required to move, for example, from point B to the target position, then it will be seen from FIG. 3 that the maximum speed limit illustrated will not be reached before the system is forced to begin to brake (at point X) in order to reach the predetermined speed at the near target position.

The value of speed required at the near target position depends on a number of factors. To minimize the overall positioning time, this speed should be as high as possible. However, there is typically a maximum speed at which the motor will reliably run in stepping mode, so this must not be exceeded if the transition from speed control mode to stepping mode is to be satisfactorily achieved.

Similarly, the distance chosen between the target and near target positions is under the control of the designer. For minimum positioning time, this distance will be one step traveled in stepping mode. This, however, will be unrealistically small in practice, since the performance in braking may vary slightly, giving some small uncertainty in the exact point at which the speed control mode is exited. To overcome this problem, the distance between near target and the target position can be set at, for example, 10 steps. This will facilitate accurate stepping to the target position without any overshoot and with only a very small penalty in extra time. If a small amount of overshoot can be tolerated in a particular application, then the distance to the near target position can be reduced to a few steps. Any overshoot would then be corrected by the system stepping back to the true target position after the overshoot is detected by the position detector.

It will be appreciated that the interrelation of the characteristics shown in FIG. 3 defines an optimum speed profile for every possible combination of starting position of the actuator and target position of the load for the given examples. Use of this optimum profile allows precise positioning of the load in the shortest possible time.

According to the invention, use is made of this fact to generate a speed profile in real time, as the machine is running. If the starting position is Point A on FIG. 3, using a speed demand value equal to or greater than the maximum speed limit will operate the machine up the line AP and along PQ. If the speed demand is then set to the minimum threshold value, the machine will follow the line QR. At that point, changing into stepping mode and synchronizing the firing signals in stepping mode with those which have been used in speed control mode will allow the machine to be quickly stepped to its final position. Open-loop stepping is well known in the art and is not described further.

The advantages of this method are several. Firstly, position is achieved in minimum time. Secondly, the system is not upset by disturbances in mechanical parameters, e.g. the friction of the load or a change in inertia of the load. Thirdly, the method can cope with a change in target position even after the positioning action has begun.

Figure 4:
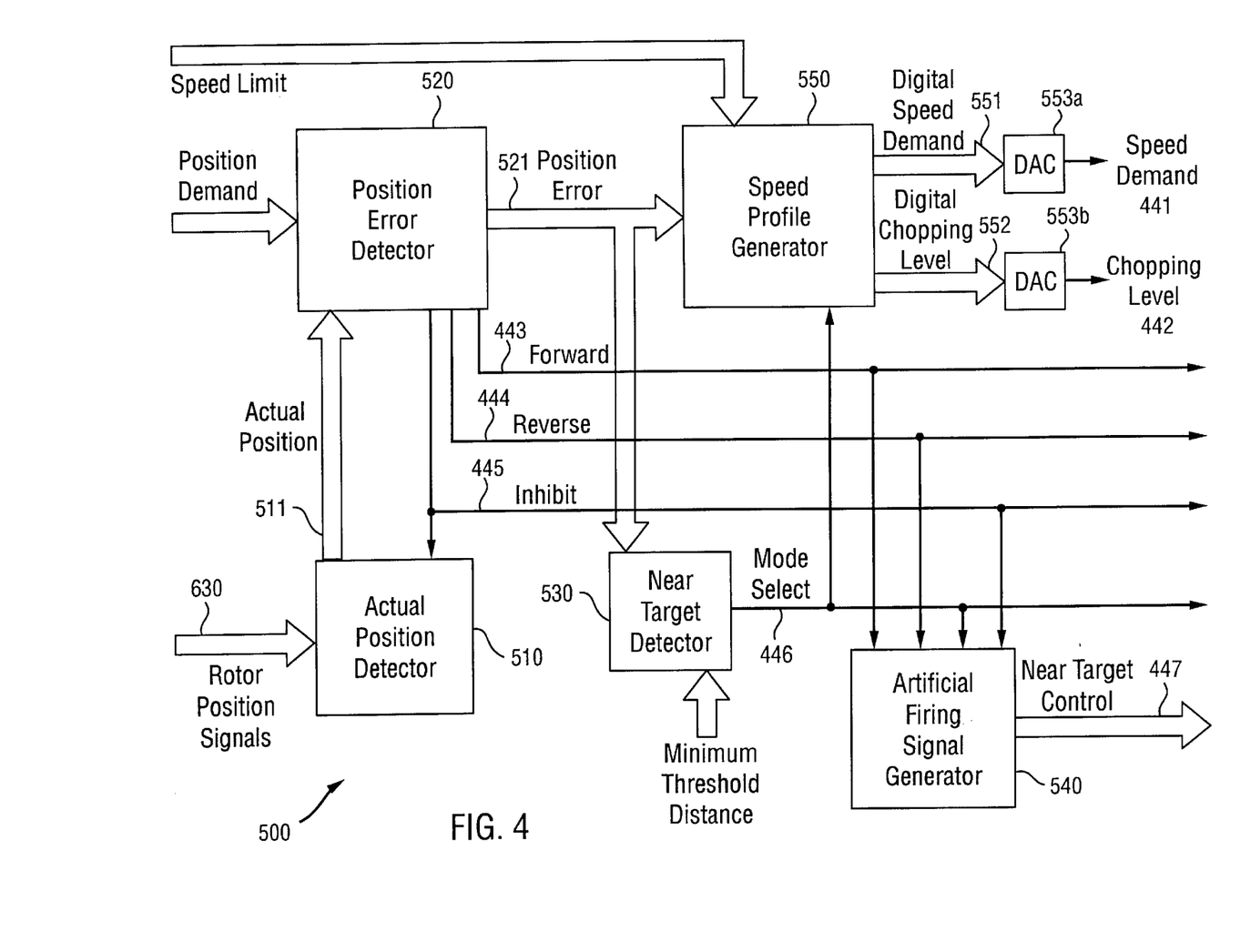
FIG. 4 is a functional block diagram of a position control system according to the present invention.

FIG. 4 is a functional block diagram of position control system 500. The dual control modes are both effected in position control system 500. Position control system 500 is preferably a digital circuit implemented in a microprocessor (e.g., a 64HC11 from Motorola, Inc.) or an application specific integrated circuit (ASIC). Position control system 500 is shown comprising actual position detector 510 receiving rotor position signals 630. Actual position detector 510 includes circuitry for generating actual position signal 511, which is preferably 8-bits. In this way, the actual angular position of rotor 610 is specified as one of 256 discrete positions.

Actual position signal 511 is provided to position error detector 520 for comparison to a predetermined 8-bit position demand signal input by user/controller 200. In response to this comparison, position error detector 520 generates forward signal, 443, reverse signal, 444, and inhibit signal, 445, and activates the appropriate one depending on whether motor 600 is below, above, or at its demanded position, respectively. Additional circuitry may be provided to monitor inhibit signal, 445 and detect a change in state of that signal, indicating that motor 600 is at its demanded position. At that point, phase firing can either be shut off or one phase can be held "on" to lock the machine in the target position. In addition, position error detector 520 produces a position error signal 521, which is preferably 8-bits, indicating the angular distance of motor 600 from its desired position.

Position error signal 521 is provided to near target detector 530 for comparison to a minimum threshold distance. If the position error is less than the minimum threshold, near-target detector 530 generates a certain level on mode select line 446, indicating that motor 600 should be operated in stepping mode. Under these conditions, artificial firing signal generator 540 provides near target control signals 447 to torque/speed control system 420 for use in operating motor 600 in a stepping mode. In addition, speed profile generator 550 generates a chopping level signal 442 from chopping level information stored therein.

If, on the other hand, the position error is greater than the minimum threshold distance, then a different level is produced on mode select line 446, indicating that motor 600 should be operated in a speed control mode. Under these conditions, speed profile generator 550 dynamically generates a digital speed demand signal 551 corresponding to the position error, or distance remaining to the target position. Speed profile generator 550 stores parameters which can be used to create the appropriate speed demand profile for each possible position error, as already described in connection with FIG. 3. A speed limit signal is provided to speed profile generator 550 to limit the digital speed demand 551 to some maximum, as described above.

The digital speed demand 551 and digital chopping level 552 are provided to respective digital-to-analog converters 553*a* and 553*b* for conversion to analog signals to be provided to torque/speed control system 420. Torque/speed control system 420 houses circuitry for synchronizing firings of motor 600 so that the angular speed of motor 600 follows the demanded speed.

Figure 5:
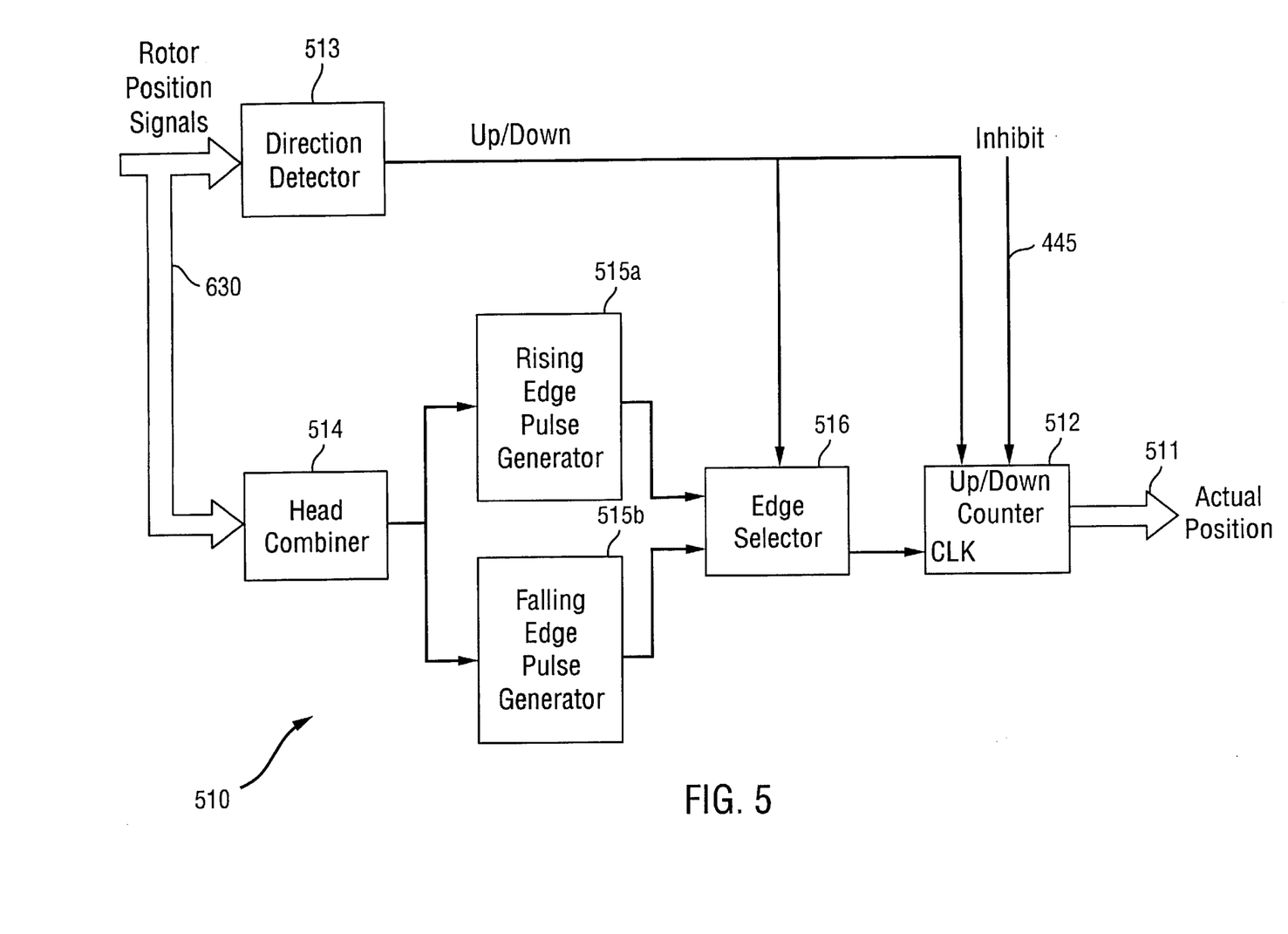
FIG. 5 is a block diagram of an actual position detector for use in the position control system.

FIG. 5 shows in greater detail the implementation of the actual position detector 510. Actual position detector 510 preferably comprises an 8-bit up/down counter 512, direction detector 513, head combiner 514, rising and falling edge pulse generators 515*a* and 515*b*, and edge selector 516. Direction detector 513 monitors rotor position signals 630 to determine the direction of motion of motor 600. The circuitry used to implement direction detector 513 may be simple combinational and sequential logic for comparing current signals to past signals. Head combiner 514 combines rotor position signals 630 derived from the plurality of sensing heads located in motor 600 into a single pulse train representing the rotation of rotor 610 in motor 600. This pulse train is fed to pulse generators 515*a* and 515*b* to generate two sets of pulses, one set for positive-going rotor position signal edges and another set for negative-going rotor position signal edges. Edge selector 516 selects the appropriate signal edge to increment/decrement counter 512 according to the direction of rotation of motor 600. When motor 600 is traveling in a forward direction, the negative-going edges are selected to increment counter 512; during reverse operation of motor 600, the positive-going edges are selected to decrement counter 512. Up/down counter 512 receives the selected edges at its CLK input and increments/ decrements the actual position signal 511 according to the current state of the up/down signal.

Actual position detector 510 may also include circuitry for monitoring the correctness of the actual position signal 511 by comparing it with the rotor position signals 630. This circuitry (not shown) can be as commonly used in the art for such operations.

Figure 6:
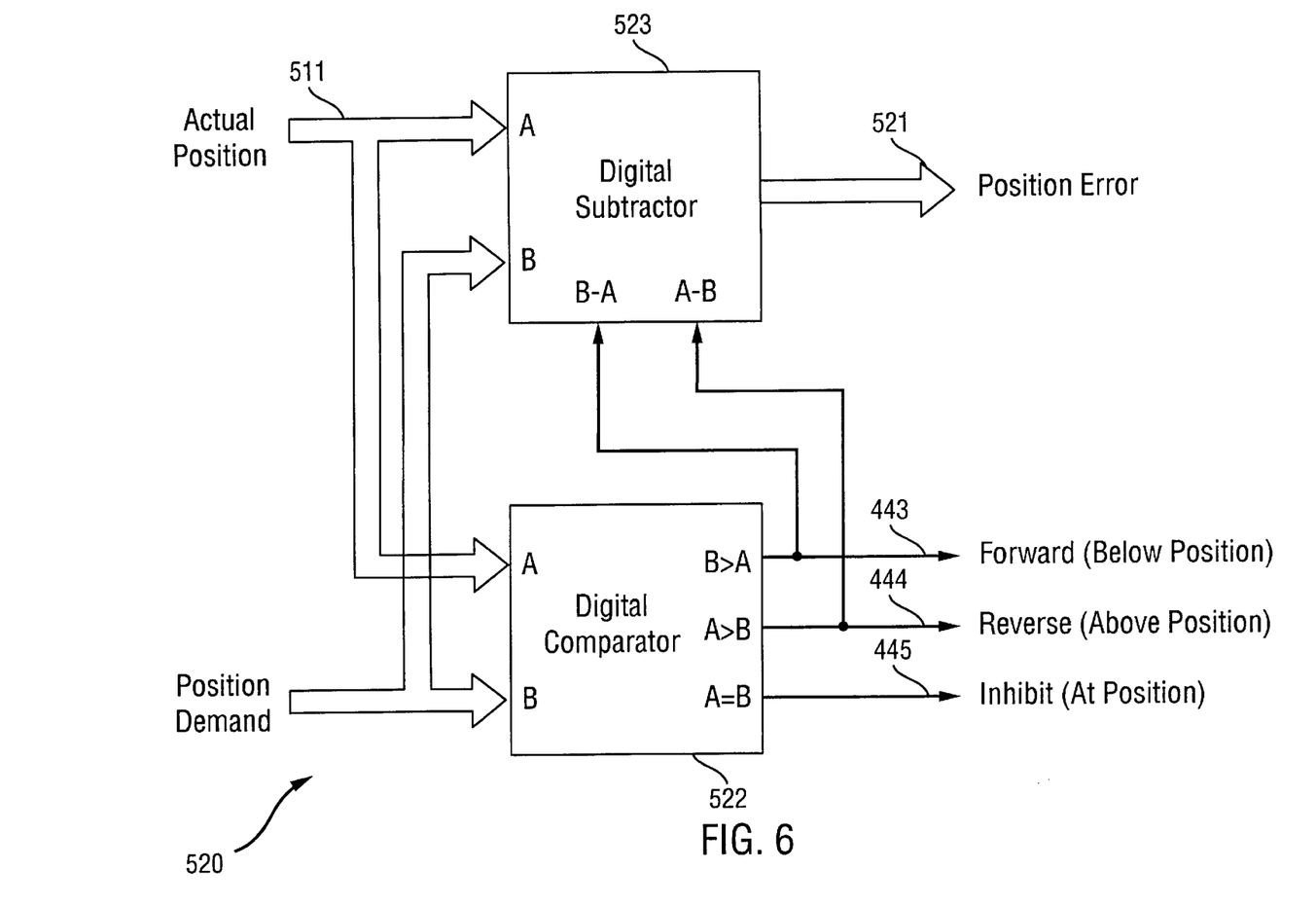
FIG. 6 is a block diagram of a position error detector for use in the position control system of the present invention.

FIG. 6 shows greater detail on the position error detector 520. This circuit compares the 8-bit position demand with the 8-bit actual position 511 signals to generate a position error 521 together with demanded direction signals (forward/reverse) and an inhibit signal indicating that motor 600 has moved to its demanded position. Position error detector 520 comprises 8-bit comparator 522 and an 8-bit arithmetic logic unit configured as digital subtractor 523. Comparator 522 compares the demanded and actual positions and outputs three signals. Forward signal 443 is made high when the demanded position is greater than the actual position, indicating that motor should move in a forward direction. Likewise, reverse signal 444 is made high when the actual position exceeds the demanded position. As will be recognized, these conventions could be reversed. Also, forward 443 and reverse 444 signals could be combined into a single signal and its complement, since the two signals are necessarily opposite.

When forward signal 443 is high, digital subtractor 523 subtracts the actual position from the demanded position. The reverse occurs when the reverse signal is high. The 8-bit position error 521 is, therefore, the modulus of the actual position error.

Figure 7:
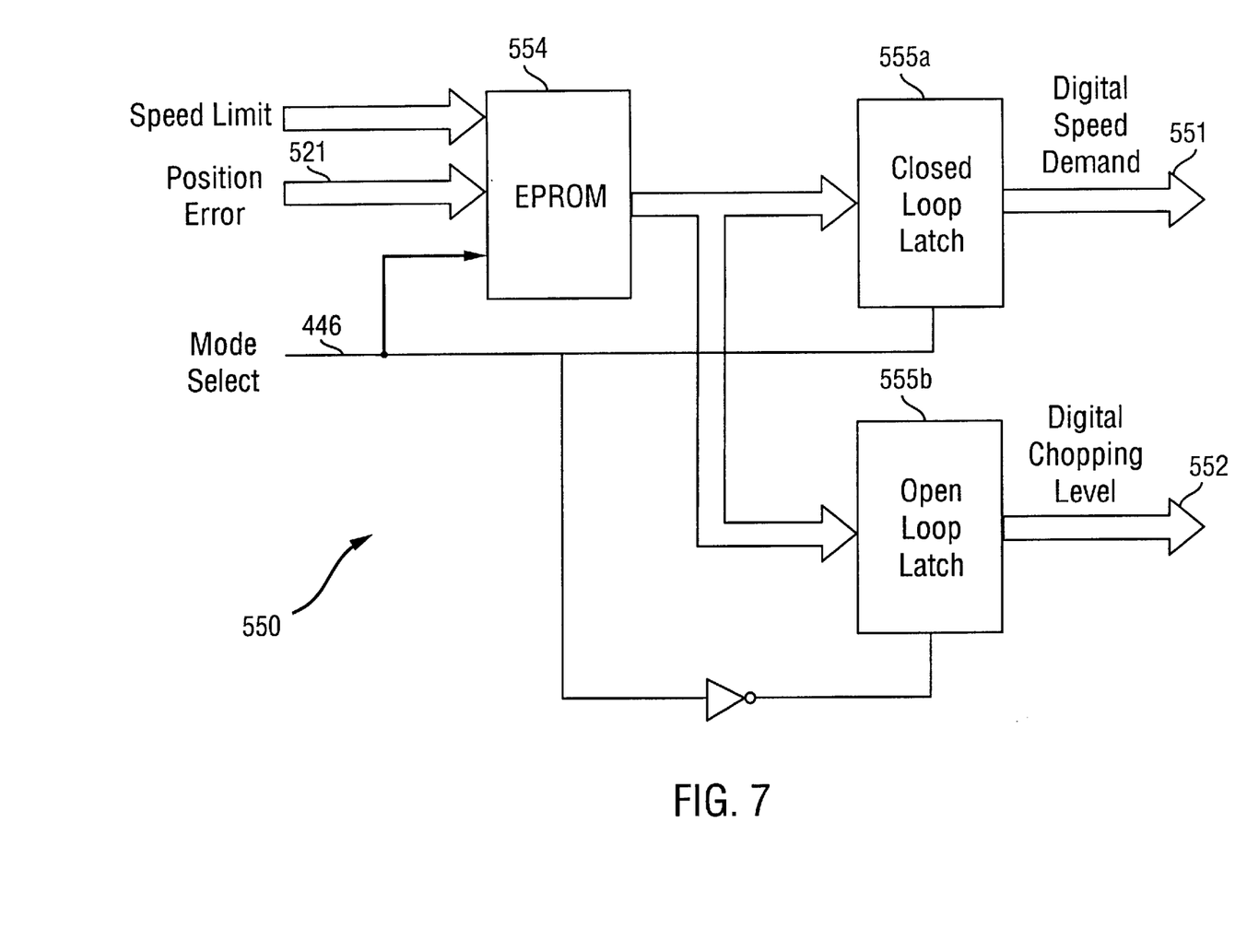
FIG. 7 is a block diagram of a speed profile generator for use in the position control system of the present invention.

FIG. 7 shows greater detail on speed profile generator 550. EPROM 554 is preferably a 64 k EPROM. EPROM 554 stores the data describing the maximum braking profile illustrated in FIG. 3 and is indexed by position error signal 521. EPROM 554 preferably stores up to 256 8-bit digital values. In addition, a 4-bit speed limit signal may be provided by user/controller 200 to limit the speed of motor 600 to some predetermined maximum. These speed demand profiles are preferably stored in one-half of EPROM 554. The other 32k of EPROM 554 may be used to store predetermined chopping levels for stepping mode. Latches 555*a* and 555*b* hold and select the appropriate output based on the level of mode select signal 446.

Figure 8:
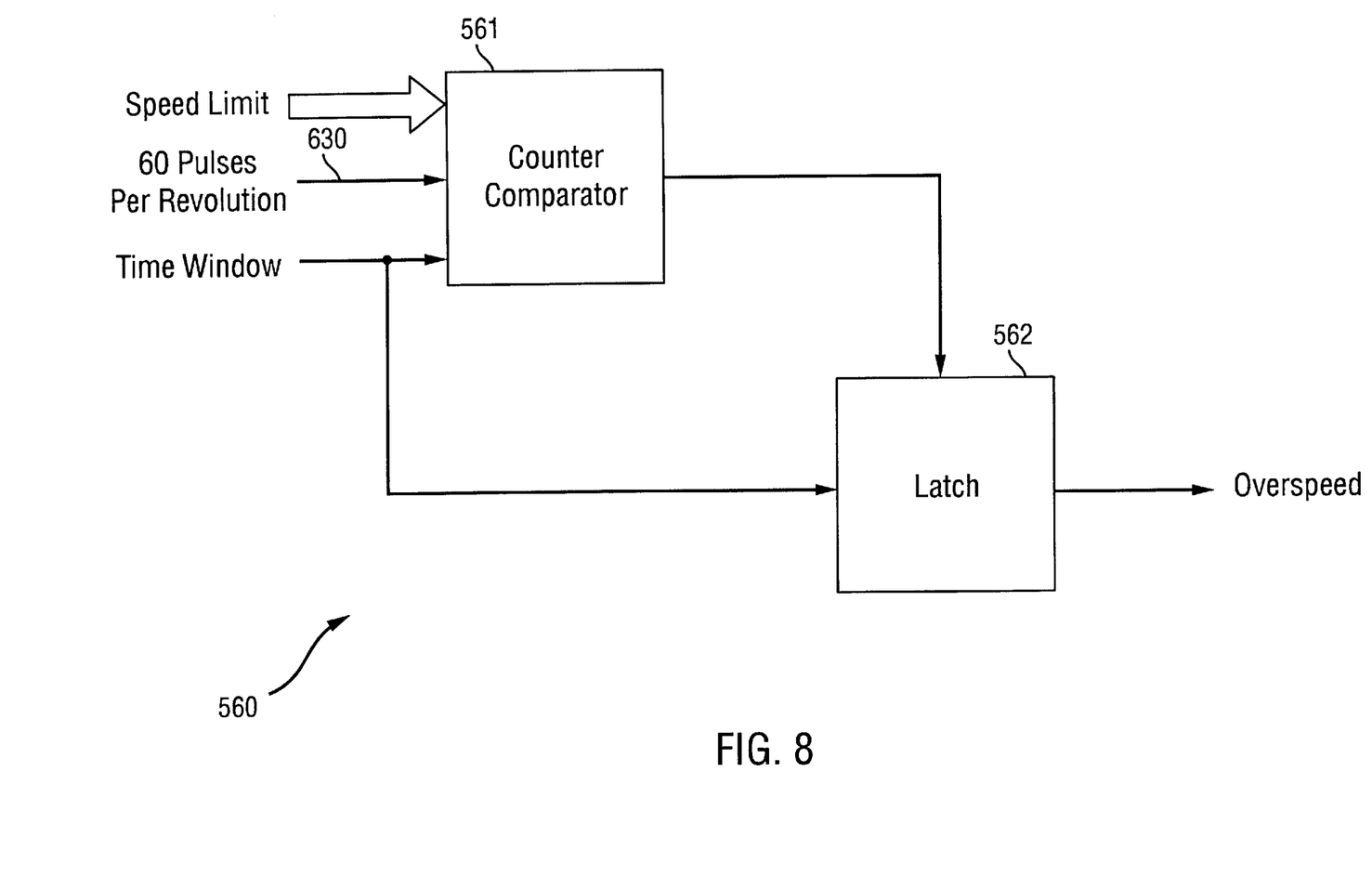
FIG. 8 is a block diagram of an overspeed detection circuit for use in the position control system of the present invention.

FIG. 8 shows details on an overspeed detection circuit 560 that can be used advantageously with the present invention. Overspeed circuit 560 is a simple digital monostable-based circuit comprising comparator 561 and latch 562. In the embodiment shown, overspeed circuit 560 counts the number of pulses of a 60 pulse per revolution (ppr) signal (derived from rotor position signals 630) during a fixed time period and compares that count to the 4-bit speed limit. If the count in any fixed time period is greater than the speed limit, an overspeed signal goes high, indicating a fault.

We claim:

1. A positioner comprising:

an electrical actuator for positioning a load at a target position;

a controller operably connected with the actuator;

means for deriving a position signal indicative of load position, which means are operably connected with the controller, the controller being responsive to the position signal to drive the actuator in a speed control mode when the load is relatively remote from the target position and in a stepping control mode when the load is relatively closer to the target position; and means for deriving a speed signal indicative of the speed of the actuator, the controller being arranged to decelerate the actuator when the position signal and the speed signal fall on a predetermined position/speed deceleration curve programmed into the controller, the curve defining a braking profile of the actuator under the control of the controller for a given load.

2. A positioner as claimed in claim 1 in which the means for deriving the position signal are a rotor position detector.

3. A positioner as claimed in claim 1 in which the controller includes storage means for storing a plurality of position and speed co-ordinates in accordance with the position/speed curve.

4. A positioner as claimed in claim 1 in which the controller is arranged to accelerate the actuator toward a predetermined maximum speed.

5. A positioner as claimed in claim 1 in which the controller includes comparator means for comparing the position signal with the target position, the controller being responsive to an output of the comparator means indicative of a local position, proximal to the target position, to change from the speed control mode of the actuator to the stepping control mode.

6. A positioner as claimed in claim 5 in which the controller is responsive to the output of the comparator means indicative of the local position coincident with the target position to lock the actuator.

7. A positioner as claimed in claim 1 in which the actuator includes a reluctance motor.

8. A method of positioning a load at a target position by means of an electrical actuator, the method comprising:
   deriving a position signal indicative of the load position;
   deriving a speed signal indicative of the speed of the actuator;
   controlling the actuator in response to the position signal in a speed control mode when the load is relatively remote from the target position and in a stepping control mode when the load is relatively closer to the target position; and
   decelerating the actuator when the position signal and the speed signal fall on a predetermined position/speed deceleration curve defining a braking profile of the actuator under the control of the controller for a given load.

9. A method as claimed in claim 8, including accelerating the actuator toward a maximum speed.

10. A method as claimed in claim 8, including comparing the position signal with the target position and changing from the speed control mode to the stepping control mode at a local position proximal to the target position.

11. A method as claimed in claim 10 in which the actuator is locked when the output of the comparator is indicative of the local position being coincident with the target position.

12. A method as claimed in claim 8 in which the actuator includes a reluctance motor, and wherein the controlling act comprises controlling the reluctance motor in response to the position signal in a speed control mode when the load is relatively remote from the target position and in a stepping control mode when the load is relatively closer to the target position.

13. A load positioning assembly comprising:
   (a) an electrical actuator
   (b) a load to be positioned at a target position;
   (c) an interface operatively coupling said actuator to said load, said actuator controlling the position of said load via said interface so that said load is in its target position when said actuator is in a predetermined position;
   (d) an actuator control system providing at least one control signal to said actuator to control the operation of said actuator;
   (e) a position detector for providing data about the actual position of said actuator;
   (f) said control system comprising position control circuitry for operating said actuator in one of at least two control modes including a speed control mode and a stepping mode; and
   (g) said control system further comprising speed detection circuitry for deriving a speed signal indicative of the speed of the actuator, the control system being arranged to decelerate the actuator when the actual position of the actuator and the speed signal fall on a predetermined position/speed deceleration curve programmed into the control system, the curve defining a braking profile of the actuator under the control of the controller for a given load.

14. A load positioning assembly of claim 13 where the actuator is a switched reluctance machine.

15. The load positioning assembly of claim 14, wherein said position control circuitry comprises:
   (a) actual position detector circuitry receiving said position signal and generating an actual position signal therefrom;
   (b) position error detector circuitry receiving said actual position signal and generating a position error signal indicative of the difference between the actual position of said motor and said predetermined position corresponding to said target position of said load; and
   (c) near target detector circuitry receiving said position error signal and causing said machine to be operated:
      (i) in the speed control mode when said position error signal is greater than a predetermined minimum threshold, and
      (ii) in the stepping mode when said position error signal is less than said predetermined threshold.

16. The load positioning assembly of claim 15, wherein said actual position detector circuitry comprises:
   (a) direction detection circuitry receiving said position signal and generating a direction signal indicative of whether said actuator is currently being moved in a forward or a reverse direction;
   (b) means receiving said position signal for generating an increment/decrement signal to track the movement of said actuator; and
   (c) an up/down counter receiving said direction signal and said increment/decrement signal and generating said actual position signal therefrom.

17. The load positioning assembly of claim 16, wherein said actuator is a switched reluctance machine.

18. The load positioning assembly of claim 15, wherein said position control system further comprises a speed demand profile generator receiving said position error signal and generating a speed demand signal dependent on said position error signal.

19. The load positioning assembly of claim 18, wherein said speed profile generator comprises storage means for storing a plurality of speed demand values and retrieving said values based on said position error when said motor is operated in said speed control mode.

20. The load positioning assembly of claim 19, wherein said storage means comprises an EPROM and said position error serves as an index into said EPROM.

21. The load positioning assembly of claim 19, wherein said speed profile generator further receives a speed limit signal and said storage means further comprises means for storing unique sets of said speed demand values, each said set corresponding to a different value of said speed limit signal.

22. The load positioning assembly of claim 19, wherein said speed profile generator comprises means for storing a plurality of chopping level values and retrieving said values when said motor is operated in said stepping mode.

23. A position control system for use in driving an electrical machine to a predetermined position, said position control system comprising:

(a) means for determining an actual position of said machine and generating an actual position signal corresponding thereto;

(b) means for receiving said actual position signal and comparing said actual position to said predetermined position and generating a position error signal indicative of the difference between said positions;

(c) means for receiving said position error signal and selecting a mode of operation for said machine from a plurality of possible modes including at least a speed control mode and a stepping mode; and (d) means for receiving said position error signal and storing and retrieving a plurality of speed demand values, each of said speed demand parameters corresponding to one of a plurality of possible states of said position error signal, said means generating a speed demand signal corresponding to the current state of said position error signal when said machine is being operated in a speed control mode.

24. The position control system of claim 23, wherein said storing and retrieving means comprises an EPROM.

25. The position control system of claim 24 wherein said system receives a speed limit input and said EPROM further comprises means for storing a plurality of sets of speed demand parameters.

26. A method of driving an electrical machine to a predetermined position, comprising the steps of:

(a) generating a plurality of predetermined speed demands corresponding to a plurality of possible states of position errors;

(b) determining the actual position of said machine;

(c) comparing said actual position of said machine to said predetermined position and generating an actual position error indicative of the difference between said positions;

(d) comparing said actual position error to a predetermined minimum threshold distance; and (e) operating said machine at a speed indicated by said predetermined speed demand corresponding to said actual position error if said position error is greater than said minimum threshold and operating said motor in a stepping mode if said position error is less than said minimum threshold.

27. The method of claim 26 comprising the additional step, performed as part of step (b), of determining whether said actual position is greater than, less than, or equal to said predetermined position and, based on said determination, generating a desired direction of movement for said machine.

\* \* \* \* \*